(12) United States Patent
Craig

(10) Patent No.: US 11,599,896 B1
(45) Date of Patent: Mar. 7, 2023

(54) ACQUISITION OF AN ITEM OR SERVICE BASED ON A DIRECTED CONTENT CAMPAIGN

(71) Applicant: Amazon Technologies, Inc., Seattle, WA (US)

(72) Inventor: Andrew David Craig, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/931,459

(22) Filed: May 13, 2020

(51) Int. Cl.
*G06Q 30/00* (2012.01)
*G06Q 30/0207* (2023.01)

(52) U.S. Cl.
CPC ..... *G06Q 30/0209* (2013.01); *G06Q 30/0239* (2013.01)

(58) Field of Classification Search
None
See application file for complete search history.

(56) References Cited

U.S. PATENT DOCUMENTS

| 2010/0223115 A1* | 9/2010 | Chodosh | G06Q 30/02 705/14.12 |
| 2015/0227954 A1* | 8/2015 | Jung | H04L 67/26 705/14.12 |
| 2018/0365722 A1* | 12/2018 | Jack | G07F 17/3248 |

\* cited by examiner

*Primary Examiner* — Alvin L Brown
(74) *Attorney, Agent, or Firm* — Eversheds Sutherland (US) LLP

(57) ABSTRACT

Technologies are provided for acquisition of an item or service based on a directed content campaign. Embodiments include a computing system that can detect selection of directed content presented at a user device. The directed content identifies a mobile application and an action that results in the item being granted. After installation of the mobile application, the computing system can receive a device identifier of the user device in response to execution of the mobile application. The computing system can then generate data identifying events within the mobile application. The computing system can determine, using the user activity data, that a particular one of those events corresponds to the action, and can then generate a message that identifies the action and the item or service. The message also includes address data for a user interface to obtain the item or service. The computing system can then cause the user device to present the message.

17 Claims, 7 Drawing Sheets

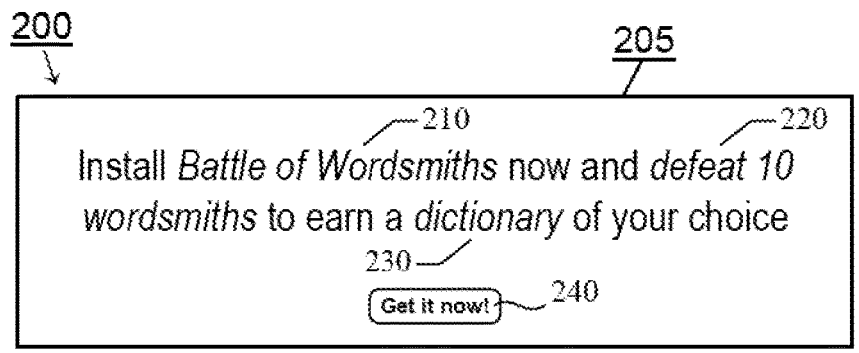
FIG. 2A
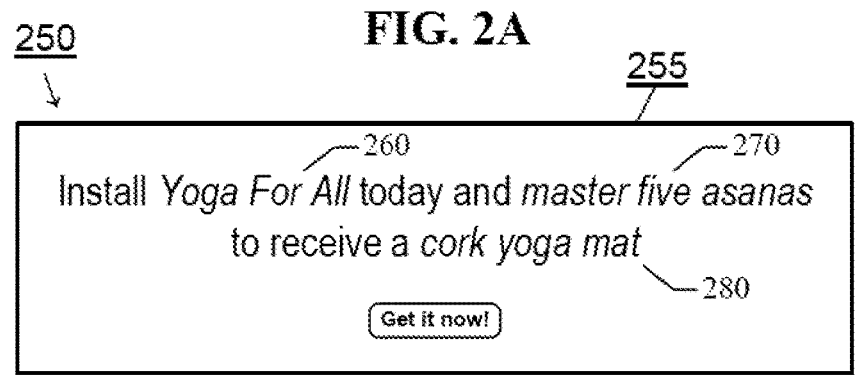
FIG. 2B
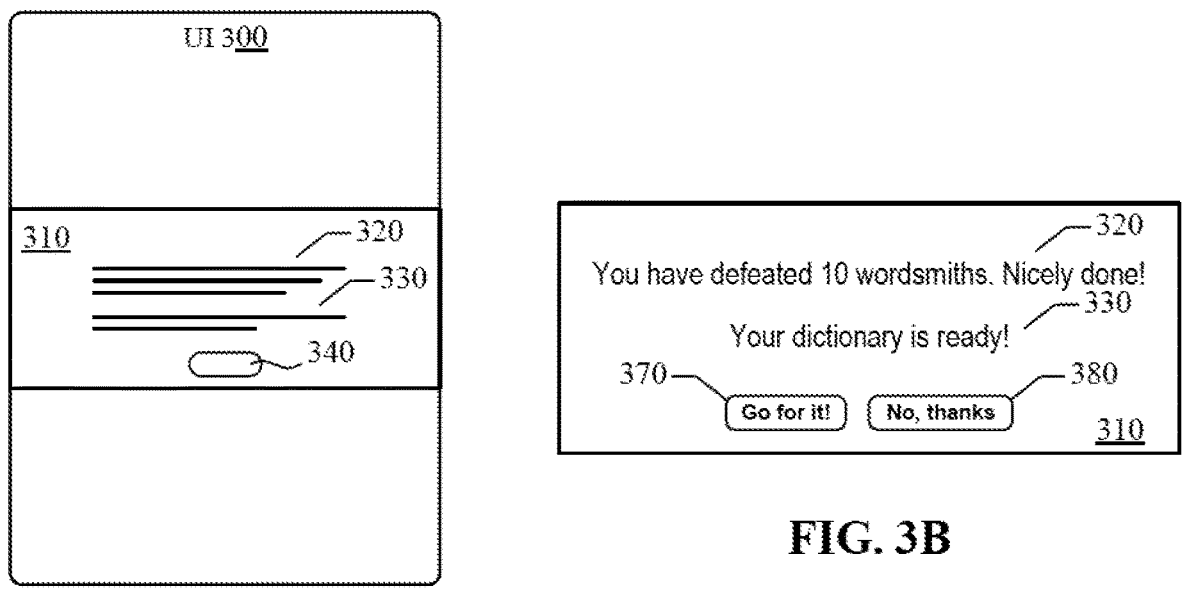
FIG. 3A
FIG. 3B

ACQUISITION OF AN ITEM OR SERVICE BASED ON A DIRECTED CONTENT CAMPAIGN

BACKGROUND

Promotional campaigns typically offer an item in exchange for subscribing to a service or acquiring a product. For example, a streaming service platform can offer a device to access streaming content in exchange for subscribing to a streaming service provided by the streaming platform. Such an exchange can be offered in an advertisement campaign. Some potential consumers can receive an impression of the advertisement campaign and, as a result, can subscribe to the streaming service. The device offered in the advertisement campaign can be provided to those potential consumers. Other potential consumers may subscribe to the streaming service without having received an impression of the advertisement campaign. Notwithstanding, those other potential consumers may also receive the offered device because commonplace technologies may not distinguish those other potential customers from those who received an impression with the offer.

Therefore, improved technologies for granting an item or service based on a directed content campaign may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

FIG. 2A illustrates an example of directed content for acquisition of a directed item, in accordance with one or more embodiments of this disclosure.

FIG. 2B illustrates another example of directed content for acquisition of a directed item, in accordance with one or more embodiments of this disclosure.

FIG. 3A illustrates an example of a message for acquisition of a directed item, in accordance with one or more embodiments of this disclosure.

FIG. 3B illustrates an example of a message for acquisition of a directed item, in accordance with one or more embodiments of this disclosure.

DETAILED DESCRIPTION

The disclosure recognizes and addresses, amongst other technical challenges, the issue of granting items or services in response to particular actions conveyed in impressions of directed content. Embodiments of the disclosed technologies, individually or in a particular combination, can detect that a mobile application has been installed in a user device in response to directed content presented in the mobile device. The directed content can prompt an end-user to install the mobile application and also can identify a particular action that results in an item being granted. In some cases, the action can be a skilled-action, where specific skill may be necessary in order to accomplish the action. In other cases, the action may be a non-skilled action, where chance or other objectives of the mobile application can determine how the action is accomplished. Regardless of its type, in some instances, such an action can be detected during the course of utilization of the mobile application. By performing the particular action, the user device becomes eligible to receive the item or service. Embodiments of the disclosed technology can then generate a message that identifies the action that has been detected and the item or service. The message can include, in some cases, a selectable user-interface element to accept the item or service. In response, embodiments of the disclosed technology can cause the user device to present a user interface to obtain the item or service. As used herein, the term "item" is used generally to mean an item, service, or combination thereof.

The disclosed technologies are not limited to mobile games and gameplay data as a source of an event that results in a reward item being granted. Indeed, the principles and practical applications of the disclosed technologies can be used in other types of software applications and user activity within the software applications.

Figure 1:
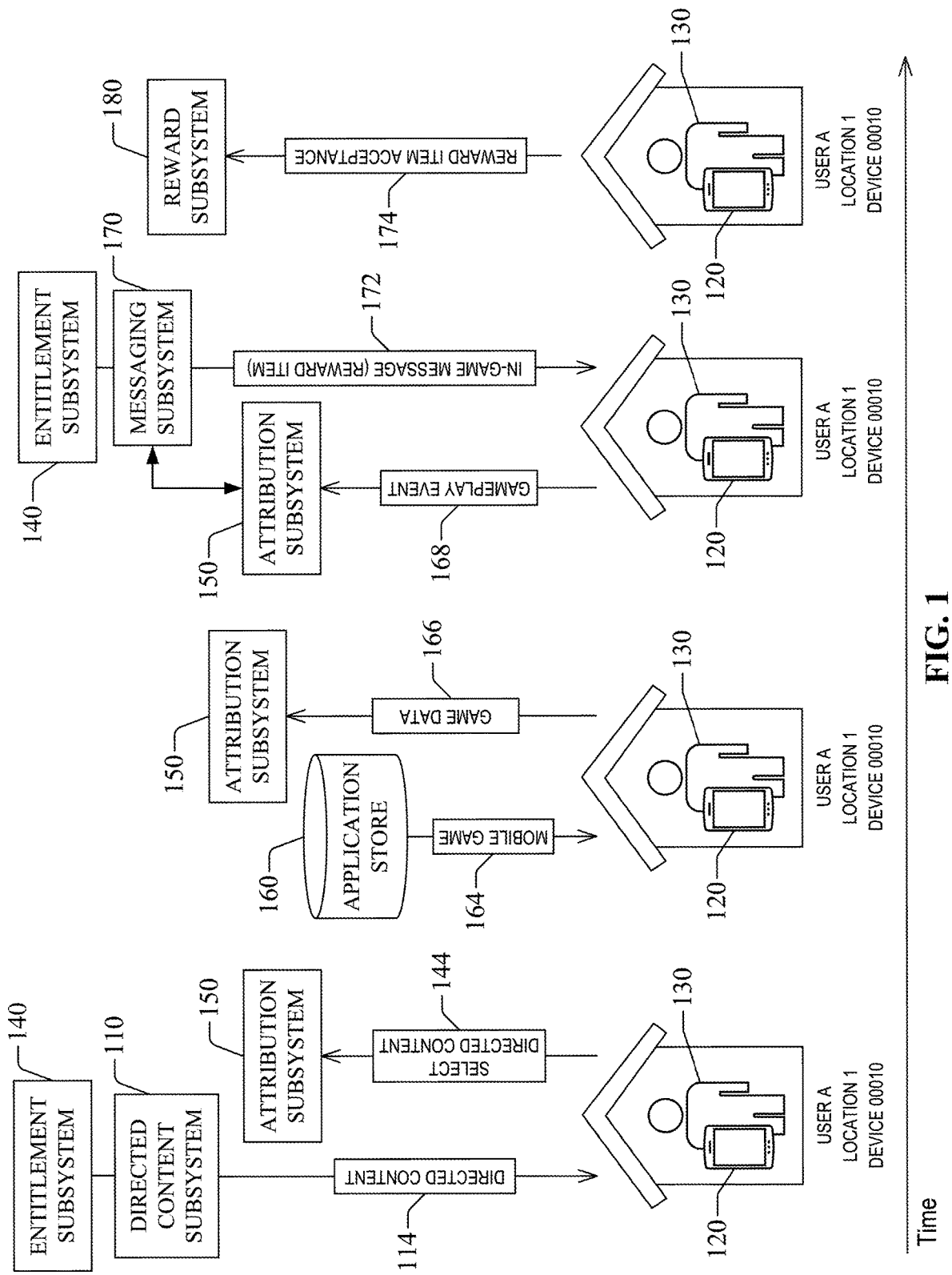
FIG. 1 illustrates an example of a sequence for acquisition of a directed item in response to a directed content campaign, in accordance with one or more embodiments of this disclosure.

With reference to the drawings, FIG. 1 is a schematic block diagram that illustrates an example of a sequence for acquisition of a reward item in response to a directed content campaign, in accordance with one or more embodiments of this disclosure. The directed content campaign can be geared towards eliciting a particular behavior from a segment of end-users that utilize a mobile application. To that end, a particular action associated with the mobile application can result in the reward item being granted. The directed content refers, for example, to digital media configured for a particular audience and/or a particular outlet channel, such as a website, a streaming service, or a mobile application. Directed content can include, for example, digital media of various types, such as advertisement; surveys or other types of questionnaires; game challenges or riddles; motion pictures, animations, or other types of video segments; video games; podcasts; audio segments of defined durations (ringtones, songs, etc.); and the like.

As is illustrated in FIG. 1, a directed content subsystem 110 can select and send directed content 114 for presentation at mobile device 120. The directed content 114 may be an advertisement, and that advertisement might be associated with a marketing campaign. The directed content 114 can be presented in a web browser or in a social media application installed in the mobile device 120. Other channels can be utilized for an impression of the directed content 114 at the mobile device 120. While the mobile device 120 is illustrated as a smartphone, the functionality of the disclosed technologies can be applied in other types of mobile devices, such as laptop computers, handheld gaming consoles, or similar. In addition, the mobile device 120 need not be placed in a dwelling. Indeed, in some embodiments, the mobile device 120 can be embodied in an in-vehicle infotainment console, for example.

The directed content 114 may be directed in a sense that it is determined or selected for delivery to the mobile device 120 based on one or more attributes associated with an account of the end-user 130. For example, the attributes may include a location associated with the end-user, an age associated with the end-user, a current location of the mobile device 120, purchasing history, buying history, wish list, playlist, etc. The directed content 114 can prompt an end-user 130 to install an application, such as a mobile game. In addition to identifying the mobile game, the directed content 114 can identify an action that results in a reward item being granted. Such an action occurs within the mobile game, and the reward item can be a digital content asset or a physical item.

Prior to sending the directed content 114, an entitlement subsystem 140 may evaluate one or several attributes of a user account associated with the mobile device 120, for example, the user account of the end-user 130. Example attributes of the user account can include a location of the user device 120, a location associated with the user account, an age associated with the end-user 130, and similar. Thus, in one configuration, the entitlement subsystem 140 can determine if one or a combination of the attributes satisfies an eligibility rule to receive reward items. The eligibility rule can be one or several eligibility rules. Example eligibility rules can take into account local laws. For instance, in some geographic regions, certain rewards may not be allowed due to local laws pertaining to gambling. Similarly, there may be age or geographic restrictions place on the reward according to a campaign to which the directed content 114 is associated. Other aspects of the eligibility rules may take into consideration whether the mobile application is a game requiring skill or is a game of chance. Further, there may be a blacklist that may block user accounts in the black list form receiving a reward item.

An example of an impression 200 of the directed content 114 is shown in FIG. 2A. The impression 200 can include indicia 205 having text 210 or another type of visual element identifying the mobile game. The indicia 205 also includes text 220 or another type of visual element identifying the action that results in the reward item. The indicia 205 also include text 230 or another type of visual element identifying the reward item. Simply for the sake of illustration, the name of mobile game that is identified is "Battle of Wordsmiths" and the action that is identified is "defeat 10 wordsmiths," where a "wordsmith" is an adversarial player in the mobile game. The reward item is a dictionary, which can be digital dictionary or a hardcopy dictionary.

In other words, by installing the mobile game and performing a particular action, such as accomplishing a particular task within the mobile game, a reward item can be obtained by an end-user of the mobile device 120. Other types of applications besides mobile games can be utilized to obtain reward items in response to performing a particular action within the mobile application or through the utilization of the mobile application. FIG. 2B illustrates another example of an impression 250 of the directed content 114. The impression 250 includes indicia 255 having text 260 identifying a mobile application ("Yoga for All") and text 270 identifying a particular action ("master five asanas"). The indicia 255 also includes text 280 identifying a reward item ("cork yoga mat") that can be obtained in response to the particular action.

The impression 200 (FIG. 2A) can further include a selectable visual element 240 that, when selected, causes the mobile device 120 to send a notification 144 (FIG. 1) indicative of the selection of the directed content 114. The notification 144 can include data defining an identifier that may either identify the directed content 114 and/or a marketing campaign associated with the directed content 114, In either case, such identifier is referred to herein as a campaign identifier (ID). Thus, in one embodiment, the campaign ID corresponds to a directed content campaign that includes the directed content 114. Thus, the campaign ID may uniquely identify the directed content campaign and/or the directed content 114.

The mobile device 120 can send the notification 144 to an attribution subsystem 150. In response to receiving the notification 144, the attribution subsystem 150 can redirect the mobile device 120 to a landing page corresponding to the mobile game within an application store 160. For purposes of illustration, the landing page can be embodied in a graphical user interface (GUI) that includes visual elements that provide a description of the mobile game. The GUI also includes a selectable visual element that can be used to install the mobile game.

By selecting that selectable visual element in the landing page, the end-user 130 can install the mobile game in the mobile device 120 from the application store 160. To that, the application store 160 can send mobile game information 164 that includes executable program code and data, both defining the mobile game. The mobile device 120 can retain the mobile game information 164 in one or more memory devices (not depicted in FIG. 1) within the mobile device 120.

The end-user 130 can initiate execution of mobile game in the mobile device 120. As a result, the mobile game can send a device ID to the attribution subsystem 150. The device ID may uniquely identifies the mobile device 120 and can be embodied in a universally unique identifier (UUID), for example. In response to receiving the device ID, the attribution subsystem 150 can create a record associating the device ID to the campaign ID corresponding to the directed content 114. In addition to receiving the device ID, the attribution subsystem may also receive a campaign ID that identifies the campaign to which the directed content is associated (and/or a directed content identifier).

The mobile game can include a group of defined events to be monitored during gameplay. The events can correspond to particular types of interaction of the end-user 130 with the mobile game during gameplay. The events can thus be associated with the device ID and respective actions within the mobile game. At least some of those interactions can correspond to various types of actions performed by the end-user 130 during gameplay. For example, one type of event can include completion of a task, such as responding to a survey or solving a puzzle, a riddle, or another type of challenge that may be solved according to rules different form the rules of the mobile game. Another type of event can include consumption of directed content (e.g., consumption of a video segment) presented during gameplay. The group of defined events also includes a particular event that corresponds to the action that results in a reward item (e.g., "defeat 10 wordsmiths").

Accordingly, the mobile device 120, by means of the mobile game 164, can send gameplay data 166 to the attribution subsystem 150. The gameplay data 166 can identify occurrence of event(s) within the group of defined events. The attribution subsystem 150 can use the gameplay data 166 to generate records of user activity within the mobile game. Included with the gameplay data 166, also referred to as user activity data, may be a game ID that identifies the mobile game 164 executing on the mobile device 120. Because the attribution subsystem 150 also has a record that associates the device ID to the directed content 114, such as by the campaign ID and/or game ID, the records of user activity also can be associated to the directed content campaign that includes the directed content 114.

During the course of gameplay, the mobile device 120 can send gameplay data 168 identifying occurrence of the event corresponding to fulfilment of the action that yields the reward item. The attribution subsystem 150 can receive the gameplay data 168 and can then update the records of user activity for the mobile device 120 and the mobile game 164. For instance, the mobile game can be Battle of Wordsmiths and the end-user 130 has defeated the 10 adversaries required to receive a dictionary as a reward item. See FIG. 2A. The mobile device 120 can send, to the attribution subsystem 150, gameplay data 168 identifying that 10 adversaries have been defeated. The attribution subsystem 150 can then update the records of user activity to indicate that such an action has been fulfilled.

A messaging subsystem 170 can obtain, from the attribution subsystem 150, the record indicating that the action that yields a reward item has been accomplished. By obtaining such a record, the messaging subsystem 170 can determine that the mobile device 120 can be provided with the reward item. Therefore, the messaging subsystem 170 can generate address data of a reward interface to obtain the reward item. In one example, the address data can define a hyperlink to a webpage including the reward interface. Alternatively, the attribution subsystem 150 may determine whether the mobile device can provided with the reward, and instruct the messaging subsystem 170 on the message to be sent to the mobile device 120. The attribution subsystem 150 may also generate the address data of the reward interface to obtain the reward item, and provide that to the messaging subsystem 170.

In addition, the messaging subsystem 170 can generate a message identifying the action that has resulted in the reward item being granted. The message also can identify that reward item and can include the address data. In some instances, such a message can be an in-application message 172. In those instances, to generate the message, the messaging subsystem 170 can generate a user interface (UI) including a description of the action, a description of the reward item, and selectable content including the address data. For example, the selectable content can include selectable text or another type of selectable visual element, or both, having the hyperlink embedded thereon. The messaging subsystem 170 can configure the UI for presentation during execution of the mobile game, within a second UI including content native to the mobile application.

The messaging subsystem 170 can cause the mobile device 120 to present the message. To that end, the messaging subsystem 170 can send the message to the mobile game. Simply as an illustration, FIG. 3A schematically depicts the in-application message 172 that may be presented at the mobile device 120. A UI 300 presents content native to the mobile game includes a UI 310 that constitutes the in-application message 172. The UI 310 includes first UI element 320 providing the description of the action that has resulted in the reward item, and a second UI element 330 providing the description of the reward item. As is shown in FIG. 3B, an example of the description of the action can include "You have defeated 10 wordsmiths." An example of the description of the reward item can include "Your dictionary is ready!"

The UI 310 also includes selectable content 340 that contains the address data defining a location of the reward interface. As is illustrated in FIG. 3B, the selectable content 340 can include a first selectable visual element 370 and a second selectable visual element 380 that permits accepting and declining the reward item, respectively. Simply for purposes of illustration, the selectable visual element 370 includes the text "Go for it!" and the selectable visual element 380 includes the text "No, thanks."

In some embodiments, the entitlement subsystem 140 may apply the eligibility rules once again to determine if the eligibility of the mobile device, for instance, the eligibility of the user account associated with the mobile device, has changed since the eligibility determination prior to the sending of the directed content 114. For instance, the user account may have been placed on a blacklist, of the location of the mobile device may have changed. In various embodiments, the eligibility may be determined prior to sending the directed content 114 and/or after the receipt of the gameplay data 168, as desired.

Selection of the selectable visual element 380 can cause the mobile game to dismiss the in-application message 172 and thus, the reward item can be declined either temporarily or permanently. In the alternative, selection of the selectable UI element 380 can cause the mobile game to send a notification message 174 to a reward subsystem 180, as is shown in FIG. 1. The notification message 174 serves as a notification of acceptance of the reward item.

The reward subsystem 180 can respond to the notification message 174 by causing the mobile device 120 to present the reward interface (not depicted in FIG. 1) to obtain the accepted reward item. In an example scenario, the selectable visual element 180 has embedded therein a hyperlink or another type of electronic link pointing to a webpage including the reward interface. Selection of the selectable visual element 180 can result in the reward subsystem 180 using address data in the hyperlink to serve the reward interface, thus redirecting the mobile device to a webpage including the reward interface.

Figure 4:
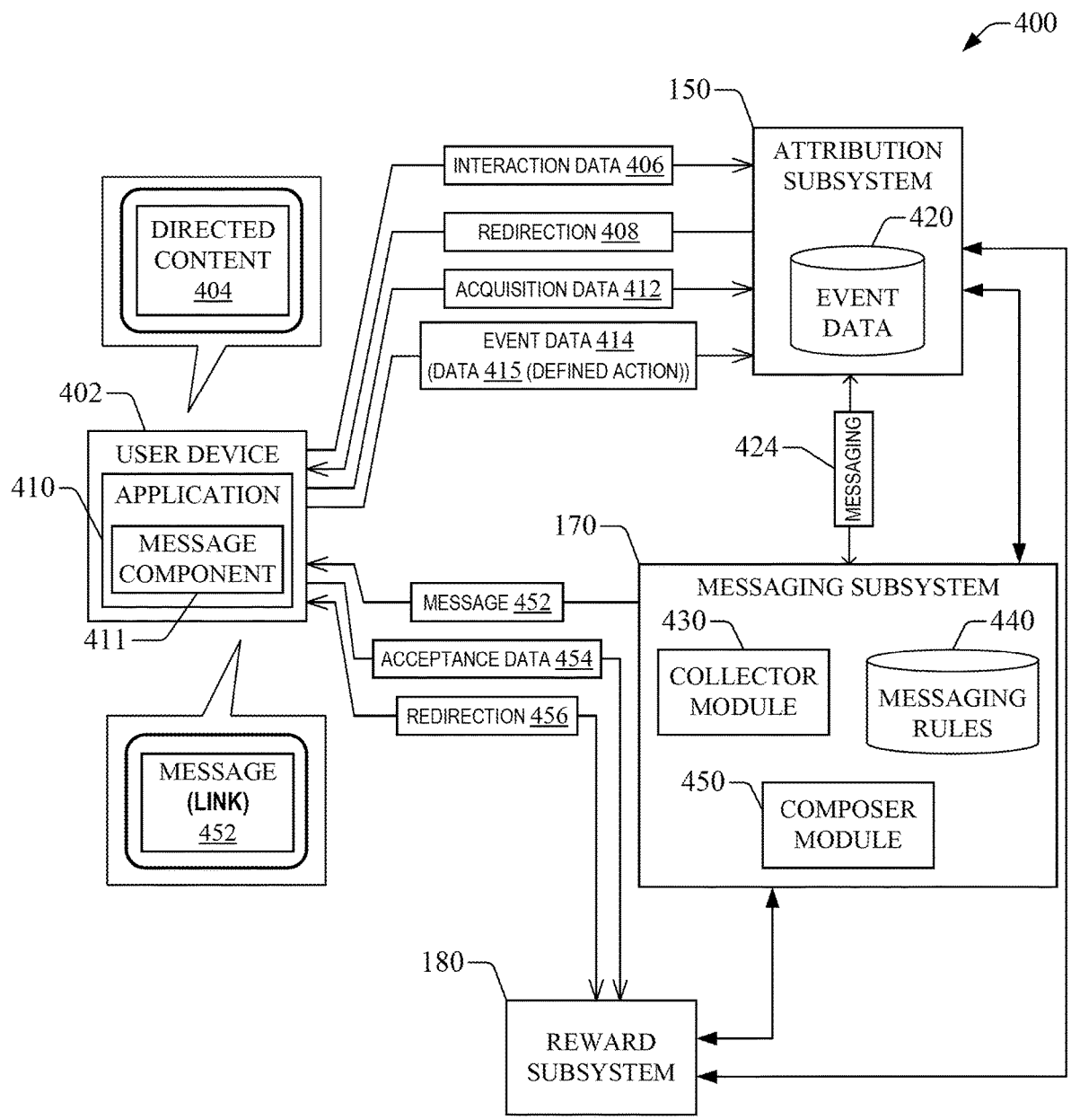
FIG. 4 illustrates an example of an operational environment for acquisition of directed items, in accordance with one or more embodiments of this disclosure.

FIG. 4 is a schematic block diagram of an example of an operational environment 400 for acquisition of a reward item in response to a directed content campaign, in accordance with one or more embodiments of this disclosure. In the operational environment 400, a user device 402 can present directed content 404. The directed content 404 can be presented in a web browser, a social media application, or another type of application installed in the user device 402. The user device 402 can be embodied in a mobile device (a smartphone, a handheld gaming console, etc.) or another type of user equipment. The user device 402 can embody the mobile device 120 (FIG. 1) in some embodiments.

As is disclosed herein, the directed content 402 can prompt an end-user (not depicted in FIG. 4) to install a mobile application 410 in the user device 402. In addition, the directed content 402 can identify an action that can result in a reward item being granted. Such an action occurs during the utilization of the mobile application 410. As mentioned, the reward item can be a digital content asset or a physical item. Examples of impressions of the directed content 404 are illustrated in FIG. 2A and FIG. 2B.

Accordingly, by installing the mobile application 410 and performing a particular action within the mobile application 410, a reward item can be obtained. To that point, an end-user can interact with the directed content 404 to install the mobile application 410. Such an interaction can cause the user device 402 to send interaction data 406 identifying the selection of the directed content 404. The interaction data 406 can include data defining a campaign identifier (ID) corresponding to the directed content 404. The campaign ID uniquely identifies the mobile device 120 and can be embodied in a unique alphanumeric code, for example.

The user device 402 can send the interaction data 406 to the attribution subsystem 150. In response to receiving the interaction data 406, the attribution subsystem 150 can redirect the user device 402 to a landing page corresponding to the mobile application 410. That end, the attribution subsystem 150 can send a redirection message 408 that causes the user device 402 to present the landing page. For purposes of illustration, the landing page can be embodied in GUI that includes visual elements that provide a description of the mobile application 410. The GUI also includes a selectable visual element that can be used to install the mobile application 410.

In response to selection of the selectable visual element in the landing page, the user device 402 can initiate the installation of the mobile application 410. The mobile application 410 may include a messaging component 411 that may provide in game messaging, such as that illustrated in FIG. 3A and 3B. As part of the installation of the mobile application 410, the user device 402 can receive mobile application information that includes executable program code and data, both defining the mobile application 410. The user device 402 can retain the mobile application information in one or more memory devices (not depicted in FIG. 1) within the user device 402.

Execution of the mobile application 410 by the user device 402 can result in the mobile application 410 sending acquisition data 412 to the attribution system 150. The acquisition data 412 can include a device ID corresponding to the user device 402, and in some embodiments a game ID that identifies the mobile application 410. The device ID uniquely identifies the mobile device 120 and can be embodied in a universally unique identifier (UUID), for example. In response to receiving the device ID, the attribution subsystem 150 can create a record associating the device ID to the campaign ID corresponding to the directed content 404.

The mobile application can include a group of defined events to be monitored during utilization of the mobile application 410. For example, in case the mobile application is a mobile game, the group of defined events can be monitored during gameplay of the mobile game. The defined events can correspond to particular types of interaction with the mobile application during the utilization of the mobile application 410. The events can thus be associated with the device ID and respective actions within the mobile application 410. At least some of those interactions can correspond to various types of actions performed by an end-user 130 as part of the utilization of the mobile application 410. For example, one type of event can include completion of a task, such as responding to a survey or solving a puzzle, a riddle, or another type of challenge that may be solved according to rules different form the rules of the mobile game. Another type of event can include consumption of directed content (e.g., consumption of a video segment) presented during gameplay. The group of defined events also includes a particular event that corresponds to the action that results in a reward item (e.g., "defeat 10 wordsmiths" in the case of the mobile game Battle of Wordsmiths mentioned above).

Accordingly, the user device 402, by means of the mobile application 410, can send event data 414 to the attribution subsystem 150. The event data 414 can identify occurrence of event(s) within the group of defined events. The attribution subsystem 150 can use the event data 414 to generate records of user activity within the mobile application 410. In some embodiments, those records can be retained in one or more memory devices 420 within the attribution subsystem 150. Because the attribution subsystem 150 also has a record that associates the device ID to the directed content 404, via the campaign ID, the records of user activity also can be associated with the directed content campaign that includes the directed content 404.

In some situations, the defined action that yields a reward item can be accomplished during the course of utilization of the mobile application 410 at the user device 402. Thus, the user device 402 can send data 415 identifying the occurrence of an event corresponding to fulfilment of the action that yields the reward item. The data 415 can be sent as part of the event data 414. The event data may also include the device ID and/or game ID. The attribution subsystem 150 can receive the data 415 and can then update the records of user activity for the user 402 and the mobile application 410. For instance, the mobile game can be Battle of Wordsmiths and an end-user has defeated the 10 adversaries required to receive a dictionary as a reward item. See FIG. 2A. The user device 402 can send, to the attribution subsystem 150, data 415 identifying that 10 adversaries have been defeated. The attribution subsystem 150 can then update the event data 420 to indicate that such an action has been accomplished.

A messaging subsystem 170 can obtain, from the attribution subsystem 150, the record indicating that the defined action that yields a reward item has been accomplished. To that end, in some embodiments, the messaging system 170 can include a collector module 430 that can send messaging 424, such as a query message to the attribution system 150. The query message can request a device ID being associated with the accomplishment of the defined action. The messaging subsystem 170 can include data defining qualifying actions in one or more memory elements (referred to as messaging rules 440). A qualifying action is an action conveyed in the directed content that caused the installation of the application 410. As mentioned, the action results in a reward item being granted. The attribution subsystem 150 can receive the query message 424 and, in some instances, can respond by sending a response message 424. The response message 424 can identify the device ID of the user device 402.

By obtaining such a record, the messaging subsystem 170 can determine that the user device 120 can be provided with the reward item. Hence, the messaging subsystem 170 can generate address data of a reward interface to obtain the reward item. To that end, the messaging subsystem 170 can include a composer module 450 that generates the address data. In one example, the address data can define a hyperlink to a webpage including the reward interface.

In some embodiments, the attribution subsystem 150 may include the logic to determine if the event data 414 is indicative of the action having been satisfied, and if so, may instructions to the messaging subsystem 170 to send a message 452 to the mobile device 402. For example, the attribution subsystem 150 can match device ID (and, in some embodiments the game ID) in the event data 414 with the corresponding device ID in the event data 420. That record may also include an indication of the campaign ID and/or the directed content (e.g., reward and action). The attribution subsystem 150 may then use this data to determine if the action has been satisfied, thus resulting in the reward item being granted. The attribution may then generate a message, including the reward UI address, to send to the messaging subsystem 170, which will generate the message for the sending to the mobile device 402.

In addition, the messaging subsystem 170 can generate a message 452 identifying the action that has resulted in the reward item being granted. The message also can identify that reward item and can include the address data. In one embodiment, the composer module 450 can generate the message 452. The composer module 450 can generate the message 452 according to a rule for communicating with the user device 120 as identified by the user device ID. The rule can be retained in the messaging rules 440, and can define a type of message to be generated and, in some cases, a communication address for the user device 120.

In some instances, the message can be generated as an in-application message. In those instances, to generate the message, the composer module 450 can generate a UI including a description of the action, a description of the reward item, and first selectable content including the address data. For example, the selectable content can include selectable text or another type of selectable visual element, or both, having the hyperlink embedded thereon. In some configurations, the UI that is generated also can include second selectable content that, in response to being selected, can cause the user device 402 to dismiss the in-application message. Thus, the reward item can be declined either temporarily or permanently. The composer module 450 can configure the UI for presentation during execution of the mobile application 410, within a second UI including content native to the mobile application. Configuring the UI can include, for example, generating formatting information for the UI and UI elements therein.

In other instances, the composer module 450 can generate the message 452 as a push notification corresponding to the mobile application 410. Thus, in one example, the composer module 450 can configure a first UI for presentation as a pop-up banner on a lock screen or home screen of the user device 402. The first UI can include, for example, a visual element (selectable or otherwise) providing an explanation that a reward item is available. The first UI also can include a selectable visual element that, in response, to being selected causes presentation of a second UI, including the description of the action, the description of the reward item, and the first selectable content including the address data.

The composer module 450 also can generate the message 452 as an email message or a text message according to various formats, e.g., a hypertext markup language (HMTL) email message, a short message service (SMS) message, a multimedia messaging service (MMS) message, messenger messages, iMessage messages, and similar. Accordingly, generating the message 452 can include generating an email message formatted according to HTML format. The email message can include the UI mentioned above. In addition, or as an alternative, generating the message 452 can include generating a text message including a selectable visual element containing a hyperlink to a webpage including such a UI (e.g., UI 310 (FIG. 3B)).

The messaging subsystem 170 can cause the user device 402 to present the message 452. To that end, the messaging subsystem 170 can send the message 452 to the user device 402. To send an email message or a text message, the messaging subsystem 170 can utilize a communication address corresponding to a user account associated with the device ID of the user device 402. An example of the message 452 that can be presented is shown in FIG. 3B. The first selectable content within the message 452 is represented with a "LINK" label in FIG. 4, simply for the sake of nomenclature. Selection of the first selectable content can cause the mobile application 410 to send acceptance data 454 to a reward subsystem 180. The acceptance data 454 serves as a notification of acceptance of the reward item.

The reward subsystem 180 can respond to the acceptance data 454 by causing the user device 402 to present the reward interface (not depicted in FIG. 4) to obtain the accepted reward item. In some configurations, the first selectable visual content (represented as LINK in message 454) has embedded therein a hyperlink or another type of electronic link pointing to a webpage including the reward interface. Selection of the first selectable visual content can result in the reward subsystem 180 using address data in the hyperlink to serve the reward interface, thus redirecting the user device 402 to a webpage including the reward interface. A redirection block 456 represents the exchange of data included in the redirection of the user device 402 to the reward interface. The reward subsystem 180 may also communicate with the attribution subsystem 150 for purposes of reporting the fulfillment of the reward, or if the reward was declined, for purposes of tracking in connection with the campaign with which the directed content is associated. The communications between the reward subsystem 180 and the attribution subsystem 150 can also mitigate fraud by the reward system confirming (e.g., authenticate) with the attribution subsystem that the acceptance data 454 is being received from the mobile device 402 that received the directed content 404.

Figure 5:
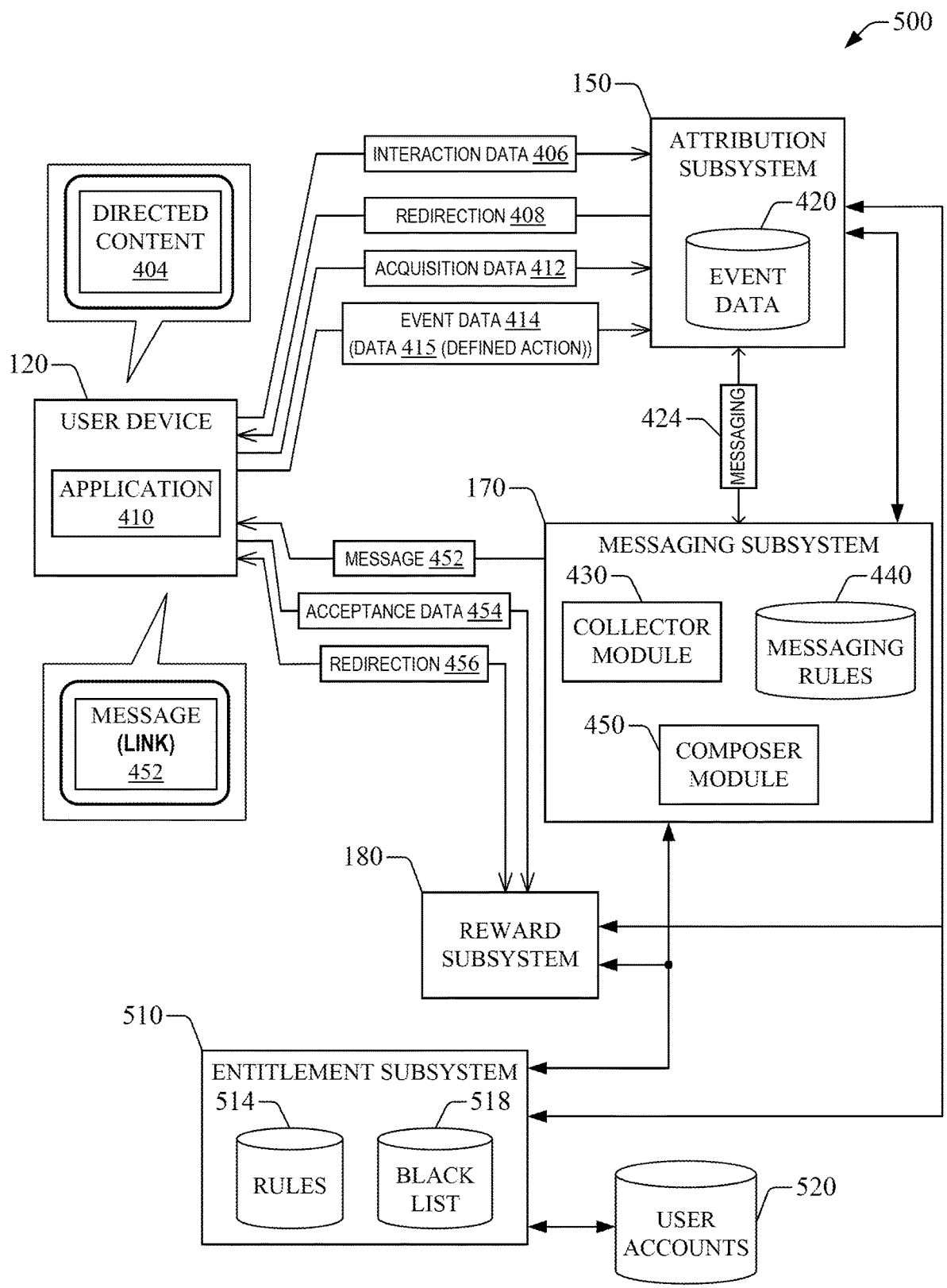
FIG. 5 illustrates an example of another operational environment for acquisition of directed items, in accordance with one or more embodiments of this disclosure.

In some embodiments, prior to generating the message 452, the messaging subsystem 170 can determine if a user account corresponding to the user device ID can be granted a reward item. To that end, as is illustrated in FIG. 5, an operational environment 500 for acquisition of a reward item can include an entitlement subsystem 510. For example, the messaging subsystem 170 can direct the entitlement subsystem 510 to evaluate one or several attributes of the user account corresponding to the device ID. Attributes of the user account can include a location of the user device 120, age of an end-user corresponding to the user device 120, and similar. Such attributes can be retained in one or more memory devices 520 (referred to as user accounts 520). Thus, in one configuration, the messaging system 170 can cause or otherwise direct the entitlement subsystem 510 to determine if one or a combination of the location or the age satisfies an eligibility rule to receive reward items. The eligibility rules can be one or several eligibility rules retained in one or more memory devices 514 (referred to as rules 514). In some situations, the entitlement subsystem 510 can determine that the location and the age satisfy the eligibility rule. The eligibility rules may be applied prior to the delivery of the directed content 404 to the user device 120 and/or prior to generation of the message 452 (or after the determination that the action has been satisfied). Applying the eligibility rules in both instances enables the detection of a change in status of the mobile device or associated mobile device that might make the mobile device ineligible, such as being added to a blacklist after the delivery of the directed content but before the sending of the message 452.

Upon application of the eligibility rules, the entitlement subsystem 510 can send a notification indicating that the user device ID is eligible to receive reward items, enabling the delivery of the directed content 404 and/or the delivery of the reward message 452. In other situations, the entitlement subsystem 170 can determine that the location and age, individually or in combination, fail to satisfy the eligibility rule. The entitlement subsystem 510 can then send a notification indicating that such a user device ID is ineligible to receive reward items.

In addition, or in other embodiments, the entitlement subsystem 510 to evaluate if the user device ID is present in an exclusion list prior to generating the message 452 or prior to delivering the directed content 404. The exclusion list defines a group of user device identifiers ineligible to receive reward items. The exclusion list can be retained in one or more memory devices 518 (referred to as black list 518). In some situations, the entitlement subsystem 510 can determine that the user device ID corresponding to the user device 120 is absent from the exclusion list. In response, the entitlement subsystem 510 can send a notification, where the notification indicates that the user device ID is eligible to receive reward items. In other situations, the entitlement subsystem 170 can determine that the user device ID corresponding to the user device 120 is absent from the exclusion list. The entitlement subsystem 510 can then send a notification indicating that such a user device ID is ineligible to receive reward items.

Figure 6:
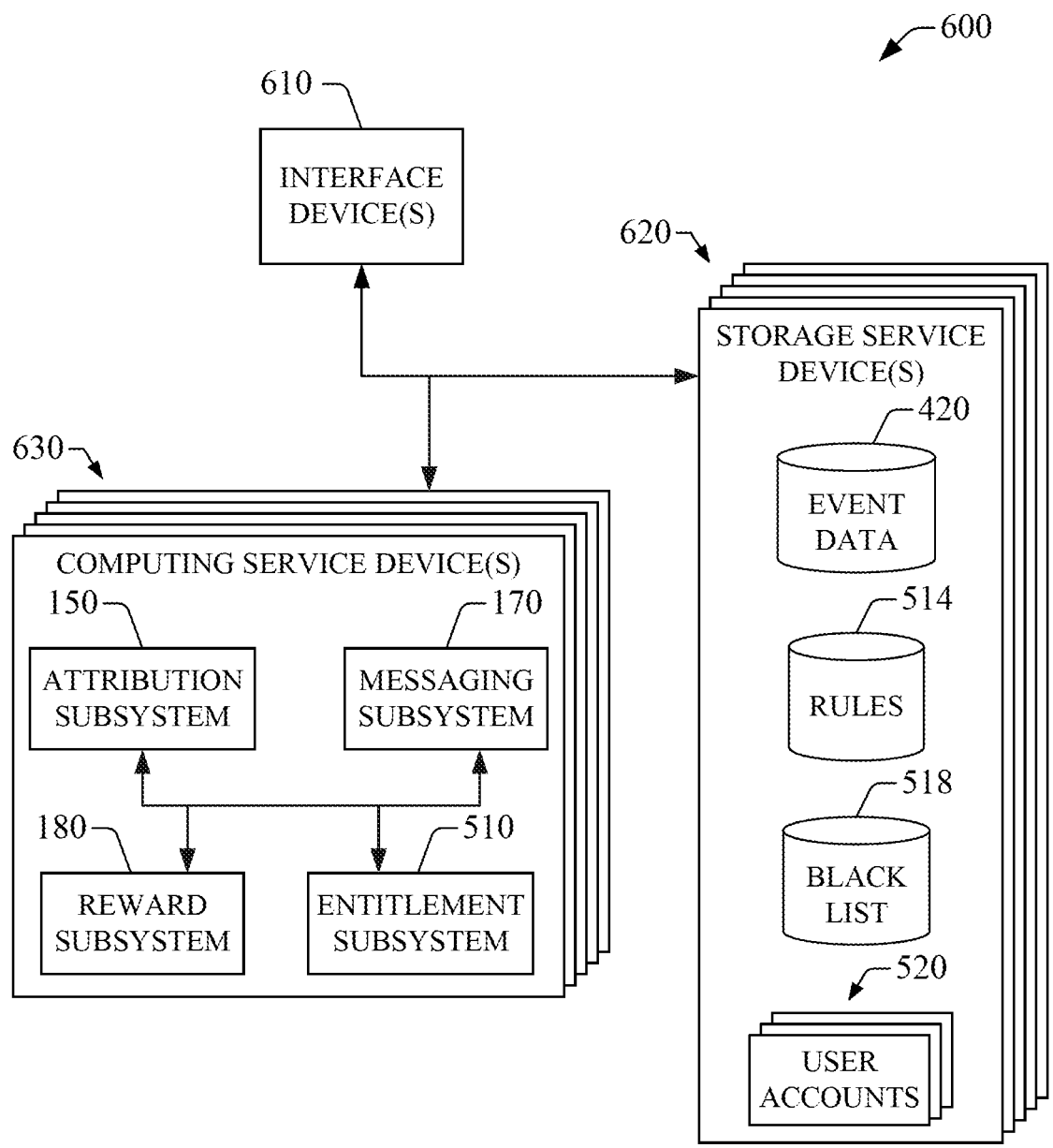
FIG. 6 illustrates an example of a computing system for acquisition of directed items, in accordance with one or more embodiments of this disclosure.

FIG. 6 is a schematic block diagram of an example of a computing system 600 for the acquisition of items based on a directed content campaign, in accordance with one or more embodiments of this disclosure. Thus, in some aspects, the computing system 500 can determine that directed content presented at a user device has been selected. As is disclosed herein, the directed content can identify, for example, a mobile application and an action that results in an item being granted. After the mobile application is installed in the user device, the computing system 600 can receive a device identifier of the user device in response to execution of the mobile application. The device identifier can be received from the mobile application installed in the user device. The computing system 600 can then generate records of user activity data within the mobile application. Such records can identify respective events within the mobile application. The computing system 600 can then determine, using the user activity data, that a particular event of those events corresponds to the action that results in the item being granted.

In response to the detection of that particular event, the computing system 600 can generate a message that identifies the action and the item. The message also includes the address data for a user interface to obtain the item. The computing system 600 can generate various types of messages according to various formats. The generated messages can include in-application messages, push notifications, email messages, text messages, or similar. The computing system 600 can then cause the user device to present the message.

In response to the message, the computing system 600 can then receive data indicative of acceptance of the item from the user device. As a result, the computing system 600 can direct the user device to the user interface to obtain the item. For example, the computing system can cause the user device to present a webpage including such a user interface. The computing system 600 can host or serve the webpage, or both, in some embodiments.

The example computing system 600 includes one or many interface devices 610 that can receive various types of notifications and/or data from a user device (e.g., user device 402; not depicted in FIG. 6). The interface devices 610 can include one or many processors functionally coupled to one or many memory devices that can retain a data collection module or another type of content ingestion component (neither one depicted in FIG. 6). In some configurations, the data collection module can include an application programming interface (API) and/or another type of program code that can permit receiving the notifications and/or data via a function call, for example. At least one of the interface devices 610 can send other types of notifications, data, and/or messages to the user device. At least a second one of the interface devices 510 can send notifications and data received from the user device to one or many computing service devices 630 included in the computing system 600.

As is illustrated in FIG. 6, in some embodiments, the computing service device(s) 630 can include the attribution subsystem 150, the messaging subsystem 170, the reward subsystem 180. In some configurations, the computing service device(s) 630 also can include the entitlement subsystem 510. Each one of those subsystems included in the computing service device(s) 630 can operate in accordance with functionality described herein in connection with the acquisition of an item based on a directed content campaign.

At least one of the computing service device(s) 630 can be functionally coupled to one or many storage devices 620. The coupling can be direct or can be mediated by at least one of the interface device(s) 610. The storage service device(s) 620 includes data and metadata that can be used to implement the functionality described herein in connection with the acquisition of an item based on a directed content campaign. The storage service device(s) 620, individually or in combination, can embody or can include, the event data 420, the rules 514, the black list 518, and the user accounts 520. The storage service device(s) 520 can retain other types of personalization data, such as purchasing activity data; browsing activity data; search activity data; customized data generated by a user account (e.g., a wish lists, brand preferences, budget preferences, etc.); a combination thereof; or similar.

Figure 7:
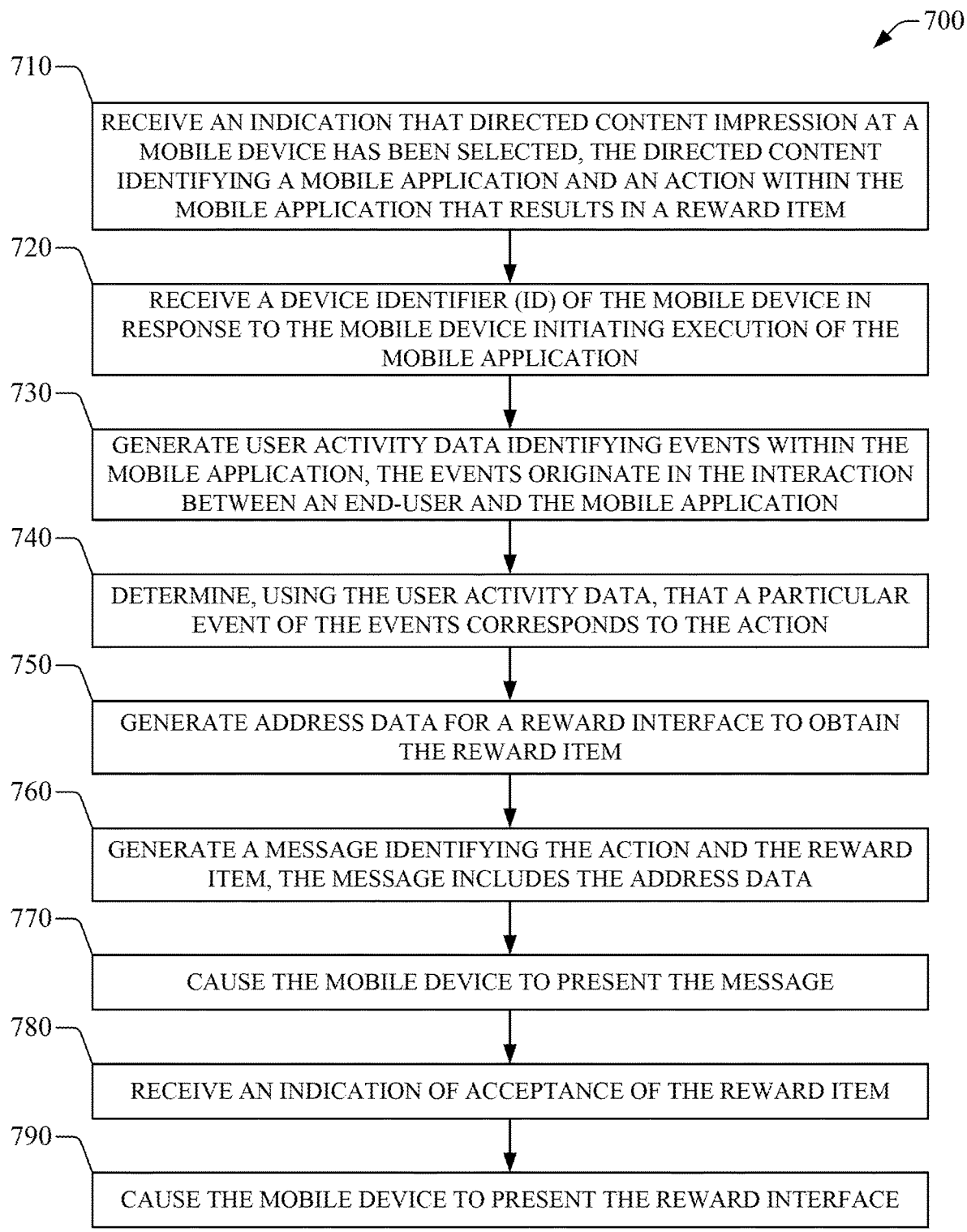
FIG. 7 illustrates an example of a computing system for acquisition of directed items, in accordance with one or more embodiments of this disclosure.

In view of the aspects of the techniques disclosed herein, an example method that can be implemented in accordance with this disclosure can be more readily appreciated with reference to the flowchart in FIG. 7. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

The methods of the disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 7 is a flowchart of an example of a method 700 for acquiring directed items, in accordance with one or more embodiments of this disclosure. The example method can be implemented, entirely or partially, by a computing system having various computing resources. The computing system has at least one processor and/or is functionally coupled to at least one processor that can implement (e.g., compile, execute, compile and execute, etc.) one or more blocks of the example method 700. The computing system also can include one or many memory devices, other types of computing resources, or a combination thereof. Such processor(s), memory device(s), and computing resource(s), individually or in a particular combination, can permit the computing system to implement the example method 700, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 700 can be implemented in a distributed fashion by two or more computing devices included in the computing system. Each one of the two or more computing devices can have at least one processor or can be functionally coupled to at least one processor, where such processor(s) can implement at least one of the one or more blocks. The computing device(s) also can be memory device(s) and/or other computing resources. Regardless of the example method 700 being implemented by a distributed or non-distributed computing system, the at least one processor can be functionally coupled to at least one memory device or other types of computer-readable non-transitory storage media.

At block 710, the computing system can receive an indication that a directed content impression at a mobile device has been selected. The directed content identifies a mobile application and an action that results in a reward item, where the action occurs within the mobile application. The mobile application can be a mobile game, for example. As mentioned, the reward item is one of a digital content asset or a physical item.

In some instances, the directed content impression elicits an end-user to install the mobile application in the mobile device. At block 720, the computing system can receive a device identifier (ID) of the mobile device in response to the mobile device initiating execution of the mobile application. The device ID can include a code that uniquely identifies the mobile device. An example of the device ID can be a universally unique ID (UUID).

At block 730, the computing system can generate user activity data identifying events within the mobile application. The events can originate from the interaction of an end-user with the mobile application in the mobile device. The events can thus be associated with the device ID and respective actions within the mobile application.

At block 740, the computing system can determine, using the user activity data, that a particular event of the events corresponds to the action.

At block 750, the computing system can generate address data a reward interface to obtain the reward item. In one example, the address data can define a hyperlink to a webpage including the reward interface.

At block 760, the computing system can generate a message identifying the action and the reward item, where the message includes the address data. The computing system can generate various types of messages according to different formats. Regardless of type, generating the message can include generating a user interface (UI), including a description of the action, a description of the reward item, and selectable content including the address data. For example, the selectable content can include selectable text that has the hyperlink embedded thereon.

In some instances, the message that is generated is embodied an in-application message. In those instances, the computing system can configure the UI (e.g., UI 310 (FIG. 3B)) for presentation during execution of the mobile application, within a second UI (e.g., UI 300 (FIG. 3A)) that presents content native to the mobile application. In other instances, the message that is generated is embodied in a push notification corresponding to the mobile application. The computing system can thus configure the UI for presentation as a pop-up banner on a lock screen or home screen of the mobile device that includes the mobile application and presents the message.

In yet other instances, generating the message can include generating an email message formatted according to a hypertext markup language (HTML) format. The email message includes the UI mentioned above. In still other instances, generating the message can include generating a text message including a selectable visual element containing a hyperlink to a webpage including such a UI (e.g., UI 310 (FIG. 3B)). Selection of the visual element can cause the mobile device that presents the text message to launch a web browser to present the webpage.

At block 770, the computing system can cause the mobile device to present the message. To that end, the computing system can send the message to the mobile device.

At block 780, the computing system can receive an indication of acceptance of the reward item. In response, at block 790, the computing system can cause the mobile device to present the reward interface.

Figure 8:
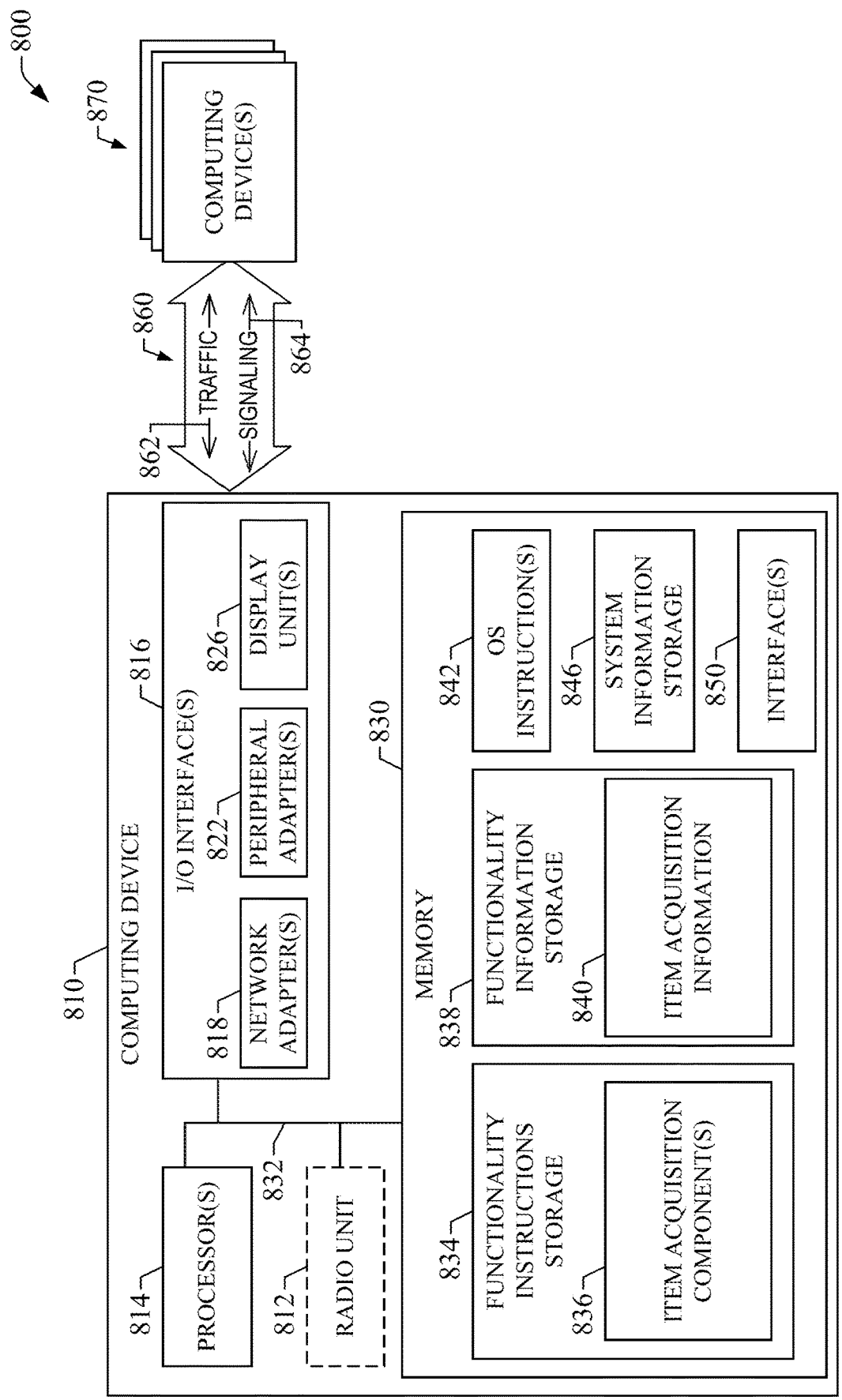
FIG. 8 illustrates an example of a computational environment for acquisition of directed assets, in accordance with one or more embodiments of the disclosure.

FIG. 8 illustrates a block diagram of an example computational environment 800 for acquisition of directed items, in accordance with one or more aspects of the disclosure. The example computational environment 800 is merely illustrative and is not intended to suggest or otherwise convey any limitation as to the scope of use or functionality of the computational environment's architecture. In addition, the illustrative computational environment depicted in FIG. 8 should not be interpreted as having any dependency or requirement relating to any one or combination of components illustrated in the example operational environments of the disclosure. The example computational environment 800 or portions thereof can embody, or can include, for example, the operational environment 400 or the computing system 500, or both.

The computational environment 800 represents an example implementation of the various aspects or elements of the disclosure in which the processing or execution of operations described in connection with the generation of points of insertion of directed content into a video asset disclosed herein can be performed in response to execution of one or many software components at the computing device 810. It should be appreciated that the one or many software components can render the computing device 810, or any other computing device that contains such components, a particular machine for generation of points of insertion of directed content into a video asset as is described herein, among other functional purposes. A software component can be embodied in or can include one or many computer-accessible instructions, e.g., computer-readable and/or computer-executable instructions. In one scenario, at least a portion of the computer-accessible instructions can embody and/or can be executed to perform at least a part of one or several of the example methods disclosed herein, such as the example method presented in FIG. 7.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 810 or other computing devices. Generally, such program modules include computer code, routines, programs, objects, components, information structures (e.g., data structures and/or metadata structures), etc., that can perform particular tasks (e.g., one or more operations) in response to execution by one or more processors, which can be integrated into the computing device 810 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with the generation of points of insertion of directed content into a video asset described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 810 can include one or more processors 814, one or more input/output (I/O) interfaces 816, a memory 830, and a bus architecture 832 (also termed bus 832) that functionally couples various functional elements of the computing device 810. In certain embodiments, the computing device 810 can include, optionally, a radio unit 812. The radio unit 812 can include one or more antennas and a communication processing unit that can permit wireless communication between the computing device 810 and another device, such as one of the computing device(s) 870. The bus 832 can include at least one of a system bus, a memory bus, an address bus, or a message bus, and can permit exchange of information (data, metadata, and/or signaling) between the processor(s) 814, the I/O interface(s) 816, and/or the memory 830, or respective functional elements therein. In certain scenarios, the bus 832 in conjunction with one or more internal programming interfaces 850 (also referred to as interface(s) 850) can permit such exchange of information. In scenarios in which processor(s) 814 include multiple processors, the computing device 810 can utilize parallel computing.

The I/O interface(s) 816 can permit communication of information between the computing device and an external device, such as another computing device, e.g., a network element or an end-user device. Such communication can include direct communication or indirect communication, such as exchange of information between the computing device 810 and the external device via a network or elements thereof. As illustrated, the I/O interface(s) 816 can include one or many of network adapter(s) 818, peripheral adapter(s) 822, and rendering unit(s) 826. Such adapter(s) can permit or facilitate connectivity between the external device and one or more of the processor(s) 814 or the memory 830. For example, the peripheral adapter(s) 822 can include a group of ports, which can include at least one of parallel ports, serial ports, Ethernet ports, V.35 ports, or X.21 ports. In certain embodiments, the parallel ports can include General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 818 can functionally couple the computing device 810 to one or many computing devices 870 via one or more traffic and signaling pipes 860 that can permit or facilitate exchange of traffic 862 and signaling 864 between the computing device 810 and the one or many computing devices 870. Such network coupling provided at least in part by the at least one of the network adapter(s) 818 can be implemented in a wired environment, a wireless environment, or both. The information that is communicated by the at least one of the network adapter(s) 818 can result from the implementation of one or more operations of a method in accordance with aspects of this disclosure. Such output can be any form of visual representation, including, but not limited to, textual, graphical, animation, audio, tactile, and the like. In certain scenarios, each one of the computing device(s) 870 can have substantially the same architecture as the computing device 810. In addition, or in the alternative, the display unit(s) 826 can include functional elements that can permit control of the operation of the computing device 810, or can permit revealing the operational conditions of the computing device 810. Such functional elements can include, for example, lighting devices, such as light-emitting diodes; a display device, such as a liquid crystal display (LCD), a plasma monitor, a light emitting diode (LED) monitor, or an electrochromic monitor; combinations thereof; or similar elements.

In one aspect, the bus 832 represents one or many of several types of bus structures, including a memory bus or a memory controller, a peripheral bus, an accelerated graphics port, and a processor or local bus using any of various bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 832, and all buses described herein can be implemented over a wired or wireless network connection and each of the subsystems, including the processor(s) 814, the memory 830 and memory elements therein, and the I/O interface(s) 816 can be contained within one or more remote computing devices 870 at physically separate locations, connected through buses of this form, in effect implementing a fully distributed system. In certain embodiments, such a distributed system can implement the functionality described herein in a client-host or client-server configuration in which the item acquisition component(s) 836 or the item acquisition information 840, or both, can be distributed between the computing device 810 and at least one of the computing device(s) 870, and the computing device 810 and at least one of the computing device(s) 870 can execute such components and/or leverage such information.

The computing device 810 can include a variety of computer-readable media. Computer-readable media can be any available media (transitory and non-transitory) that can be accessed by a computing device. In one aspect, computer-readable media can include computer non-transitory storage media (or computer-readable non-transitory storage media) and communications media. As such, computer-readable non-transitory storage media can be any available media that can be accessed by the computing device 810, and can include, for example, both volatile and non-volatile media, and removable and/or non-removable media. In one aspect, the memory 830 can include computer-readable media in the form of volatile memory, such as random access memory (RAM), and/or non-volatile memory, such as read-only memory (ROM).

As is illustrated in FIG. 8, the memory 830 can include functionality instructions storage 834 and functionality information storage 838. The functionality instructions storage 834 can include computer-accessible instructions that, in response to execution (by at least one of the processor(s) 814), can implement one or more of the functionalities of the technologies disclosed herein. The computer-accessible instructions can embody, or can include, one or many software components illustrated as item acquisition component(s) 836. In one scenario, execution of at least one component of the item acquisition component(s) 836 can implement one or several of the methods described herein, such as the example method 600, or both. For instance, such execution can cause a processor (e.g., one of the processor(s) 814) that executes the at least one component to carry out one or a combination of the disclosed example methods. It should be appreciated that, in one aspect, a processor of the processor(s) 814 that executes at least one of the item acquisition component(s) 836 can retrieve information from or retain information in one or many memory elements 840 in the functionality information storage 838 in order to operate in accordance with the functionality programmed or otherwise configured by the item acquisition component(s) 836. The one or many memory elements 840 may be referred to as item acquisition information 840. Such information can include at least one of code instructions, information structures, or the like.

In some embodiments, one or many components of the item acquisition component(s) 836 can embody, or can be part of, at least one of the attribution subsystem 150, the messaging subsystem 170, the reward subsystem 180, or the entitlement subsystem 510. As such, the one or many components can operate in accordance with, and can provide the functionality of, the attribution subsystem 150, the messaging subsystem 170, the reward subsystem 180, or the entitlement subsystem 510 in accordance with aspects described in this disclosure. In other embodiments, one or many of the item acquisition component(s) 836 in combination with at least one of the processor(s) 814 can embody or can constitute at least one of the attribution subsystem 150, the messaging subsystem 170, the reward subsystem 180, or the entitlement subsystem 510, and can operate in accordance with, and can provide the functionality of, such units in accordance with aspects described in this disclosure.

At least one of the one or more interfaces 850 (e.g., application programming interface(s)) can permit or otherwise facilitate communication of information between two or more components within the functionality instructions storage 834. The information that is communicated by the at least one interface can result from implementation of one or many operations in a method of this disclosure. In some embodiments, the functionality instructions storage 834 or the functionality information storage 838, or both, can be embodied in or can include removable/non-removable, and/or volatile/non-volatile computer storage media.

At least a portion of at least one of item acquisition component(s) 836 or item acquisition information 840 can program or otherwise configure one or many of the processors 814 to operate at least in accordance with the functionality described herein. One or many of the processor(s) 814 can execute at least one of the item acquisition component(s) 836 and utilize at least a portion of the information in the functionality information storage 838 in order to generate points of insertion of directed content into a video asset in accordance with one or more aspects described herein.

It should be appreciated that, in some scenarios, the functionality instruction(s) storage 834 can embody, or can include, a computer-readable non-transitory storage medium having computer-accessible instructions that, in response to execution, cause at least one processor (e.g., one or several of the processor(s) 814) to perform a group of operations including the operations or blocks described in connection with the disclosed methods.

In addition, the memory 830 can include computer-accessible instructions and information (e.g., data, metadata, and/or programming code instructions) that permit or facilitate the operation and/or administration (e.g., upgrades, software installation, any other configuration, or the like) of the computing device 810. Accordingly, as illustrated, the memory 830 can include a memory element 842 (labeled operating system (OS) instruction(s) 842) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 810 can dictate a suitable OS. The memory 830 also includes system information storage 846 having data, metadata, and/or programming code that permits or facilitates the operation and/or administration of the computing device 810. Elements of the OS instruction(s) 842 and the system information storage 846 can be accessible or can be operated on by at least one of the processor(s) 814.

It should be recognized that while the functionality instructions storage 834 and other executable program components, such as the OS instruction(s) 842, are illustrated herein as discrete blocks, such software components can reside at various times in different memory components of the computing device 810, and can be executed by at least one of the processor(s) 814. In certain scenarios, an implementation of the item acquisition component(s) 836 can be retained on or transmitted across some form of computer-readable media.

The computing device 810 and/or one of the computing device(s) 870 can include a power supply (not shown), which can power up components or functional elements within such devices. The power supply can be a rechargeable power supply, e.g., a rechargeable battery, and can include one or more transformers to achieve a power level suitable for the operation of the computing device 810 and/or one of the computing device(s) 870, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 818) to connect operationally to the conventional power grid. In another aspect, the power supply can include an energy conversion component, such as a solar panel, to provide additional or alternative power resources or autonomy for the computing device 810 and/or one of the computing device(s) 870.

The computing device 810 can operate in a networked environment by utilizing connections to one or many remote computing devices 870. As an illustration, a remote computing device can be a personal computer, a portable computer, a server, a router, a network computer, a peer device or other common network node, or similar. As is described herein, connections (physical and/or logical) between the computing device 810 and a computing device of the one or many remote computing devices 870 can be made via one or more traffic and signaling pipes 860, which can include wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 870) that are functionally coupled (e.g., communicatively linked or otherwise coupled) through a network having traffic and signaling pipes and related network elements. In a distributed computing environment, in one aspect, one or more software components (such as program modules) can be located in both a local computing device 810 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can include solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to include one or many of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for acquisition of a directed item in response to a directed content campaign. It is, of course, not possible to describe every conceivable combination of elements and/or method for purposes of describing the various features of this disclosure, but it can be recognized that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
   determining directed content to be sent to a mobile device associated with a user account, wherein the directed content prompts a user of the mobile device to install a mobile game and perform an action within the mobile game that results in a reward item being granted, wherein determining the directed content includes determining that an attribute of the user account satisfies an eligibility rule associated with the directed content, wherein the attribute includes at least one of a location associated with the user account or age of an end-user associated with the user account;
   receiving, by a computing system comprising at least one processor, after determining the directed content includes determining that the attribute satisfies an eligibility rule associated with the directed content, an indication that the directed content presented at the mobile device has been selected, the indication including a device identifier of the mobile device and an identifier of the directed content;
   sending, by the computing system, a user interface (UI) to the mobile device, the user interface with selectable content to install the mobile game;
   causing the mobile game to be installed on the mobile device through a selection of the selectable content;
   receiving, by the computing system, the device identifier and a game identifier of the mobile game based on the mobile device initiating execution of the mobile game;
   receiving, by the computing system, user activity data identifying events within the mobile game;
   determining, by the computing system, using the user activity data, that the user activity data corresponds to the action;
   generating, by the computing system, a link to a reward checkout interface to obtain the reward item;
   generating, by the computing system, a message identifying the action and the reward item, the message including the link;
   sending, by the computing system, the message to the mobile device;

receiving, by the computing system, an indication of acceptance of the reward item; and sending, by the computing system, the reward checkout interface to the mobile device.

2. The method of claim 1, wherein receiving the user activity data includes receiving the device identifier and the game identifier, and wherein determining that the user activity data corresponds to the action includes determining an association between the user activity data and the directed content.

3. The method of claim 1, wherein the generating the message comprises generating a second user interface (UI) including a description of the action, a description of the physical reward item, and second selectable content including the link, and wherein the second UI is configured for presentation during execution of the mobile game within a third UI presenting content native to the mobile game.

4. A method, comprising:
receiving, by a computing system comprising at least one processor, an indication that content presented at a mobile device has been selected, the content prompting a user of the mobile device to install a mobile application and perform an action within the mobile application that results in a reward item being granted;
determining, prior to receiving the indication that content presented at the mobile device has been selected, that at least one attribute of a user account with which the mobile device is associated satisfies a reward entitlement rule, wherein the attribute includes one of a location associated with the user account or age of an end-user associated with the user account;
receiving, by the computing system, a device identifier of the mobile device;
receiving, by the computing system, user activity data from the mobile application, the user activity data associated with the device identifier;
determining, by the computing system, using the user activity data, that the action has been satisfied;
generating, by the computing system, address data for a reward interface to obtain the reward item;
generating, by the computing system, a message identifying the action and the reward item, the message comprising the address data; and
sending, by the computing system, the message to the mobile device.

5. The method of claim 4, further comprising,
receiving, by the computing system, an indication of acceptance of the reward item; and
sending, by the computing system, a reward content to the mobile device.

6. The method of claim 4, further comprising determining the content to be sent to the mobile device, wherein the content is directed content based on an attribute of a user account associated with the mobile device.

7. The method of claim 4, wherein the sending the message comprises configuring the user interface (UI) for presentation by the mobile application.

8. The method of claim 4, wherein the generating the message further comprises,
generating a second UI including a visual element providing an explanation that the reward item is available and a selectable visual element that, in response to being selected, causes presentation of the UI; and
generating a push notification corresponding to the mobile application, the push notification comprising the second UI.

9. The method of claim 4, further comprising determining, by the computing system, after determining the action has been satisfied, that at least one attribute of a user account with which the mobile device is associated satisfies a reward entitlement rule.

10. The method of claim 4, further comprising determining, by the computing system, that the device identifier is absent from a list defining a group of device identifiers ineligible to receive reward items.

11. The method of claim 4, wherein the reward item is a physical item included in a wish list associated with a user account corresponding to the mobile device.

12. A computing system, comprising:
at least one processor; and
at least one memory device having computer-executable instructions stored thereon that, in response to execution by the at least one processor, cause the computing system to:
receive an indication that directed content presented at a user device has been selected, the directed content identifying an application to install and an action within the application to perform that results in an item being granted;
determining, prior to receiving the indication that content presented at the mobile device has been selected, that at least one attribute of a user account with which the mobile device is associated satisfies a reward entitlement rule, wherein the attribute includes one of a location associated with the user account or age of an end-user associated with the user account;
receive a device identifier of the user device in response to the user device initiating installation of the application;
determine user activity data received from the application, the user activity data defining events associated with the device identifier and respective actions associated with execution of the application;
determine, using the user activity data, that a first event of the events corresponds to the action;
generate address data for a user interface to obtain the item;
generate a message identifying the action and the item, the message comprising the address data; and
send the message to the user device.

13. The computing system of claim 12, the at least one memory device having further computer-executable instructions stored thereon that, in response to execution by the at least one processor, cause the computing system at least to,
receiving, by the computing system, an indication of acceptance of the item; and
sending, by the computing system, a reward interface to the user device.

14. The computing system of claim 12, wherein sending the message comprises sending a second UI, the second UI configured to be presented during execution of the application, the second UI being presented within a third UI that presents content native to the mobile application.

15. The computing system of claim 12, wherein generating the message further comprises at least one of,
generating an email message formatted according to a hypertext markup language (HTML) format, the email message comprising the UI;
generating a push notification corresponding to the mobile application, wherein selection of the push notification cause presentation of the UI; or generating a text message comprising a link to a webpage including the UI.

16. The computing system of claim 12, the at least one memory device having further computer-executable instructions stored thereon that, in response to execution by the at least one processor, cause the computing system at least to determine the directed content to be sent to the user device, wherein the directed content is based on an attribute of a user account associated with the user device.

17. The computing system of claim 12, the at least one memory device having further computer-executable instructions stored thereon that, in response to execution by the at least one processor, cause the computing system at least to determine that the device identifier is absent from a list defining a group of device identifiers ineligible to receive the item.

\* \* \* \* \*